Feb. 1, 1944.   G. O. HOFFSTETTER   2,340,810
MATERIAL SPREADER
Filed Feb. 18, 1942   3 Sheets-Sheet 2
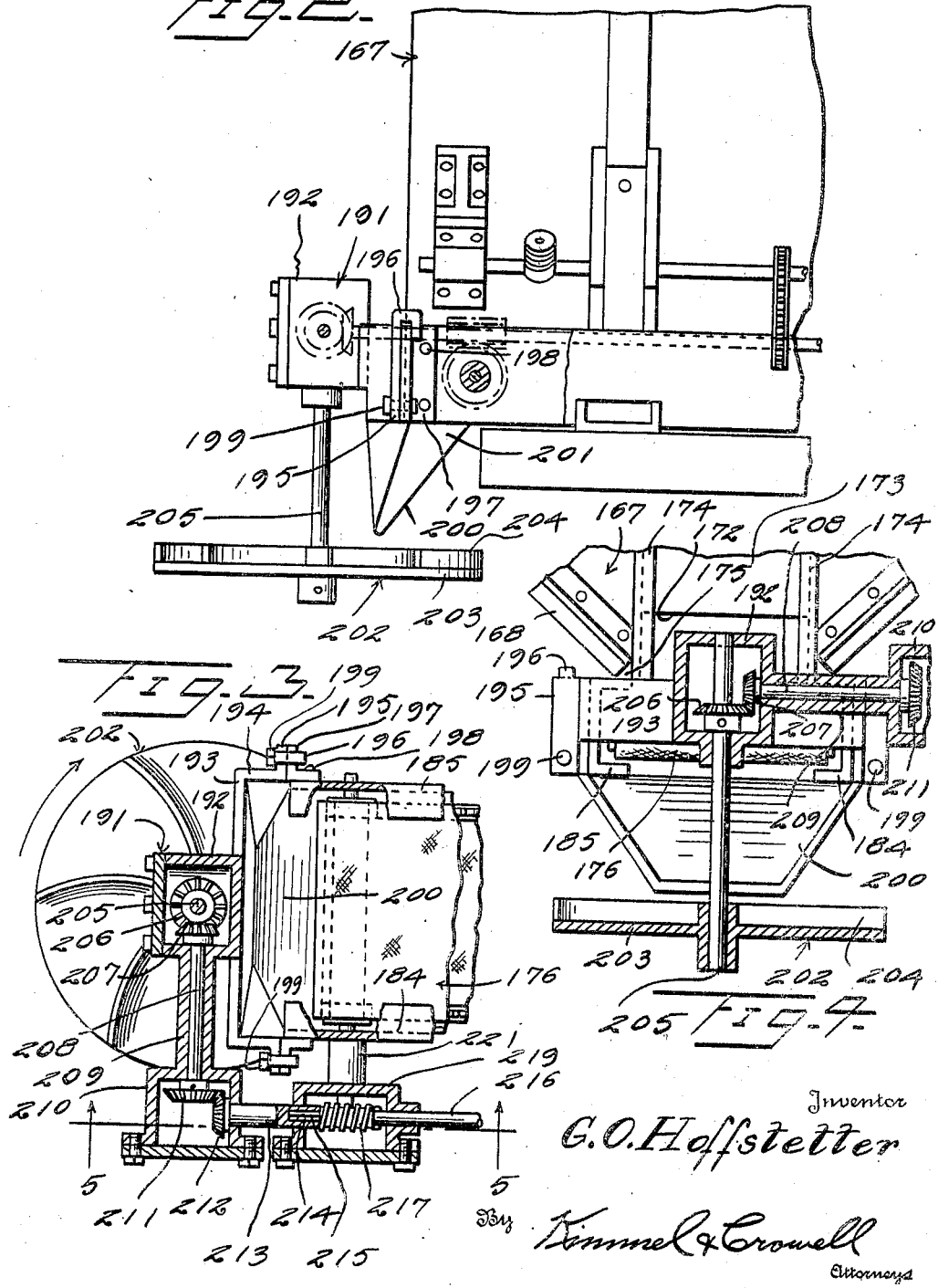
Inventor
G. O. Hoffstetter
By Kimmel & Crowell
Attorneys

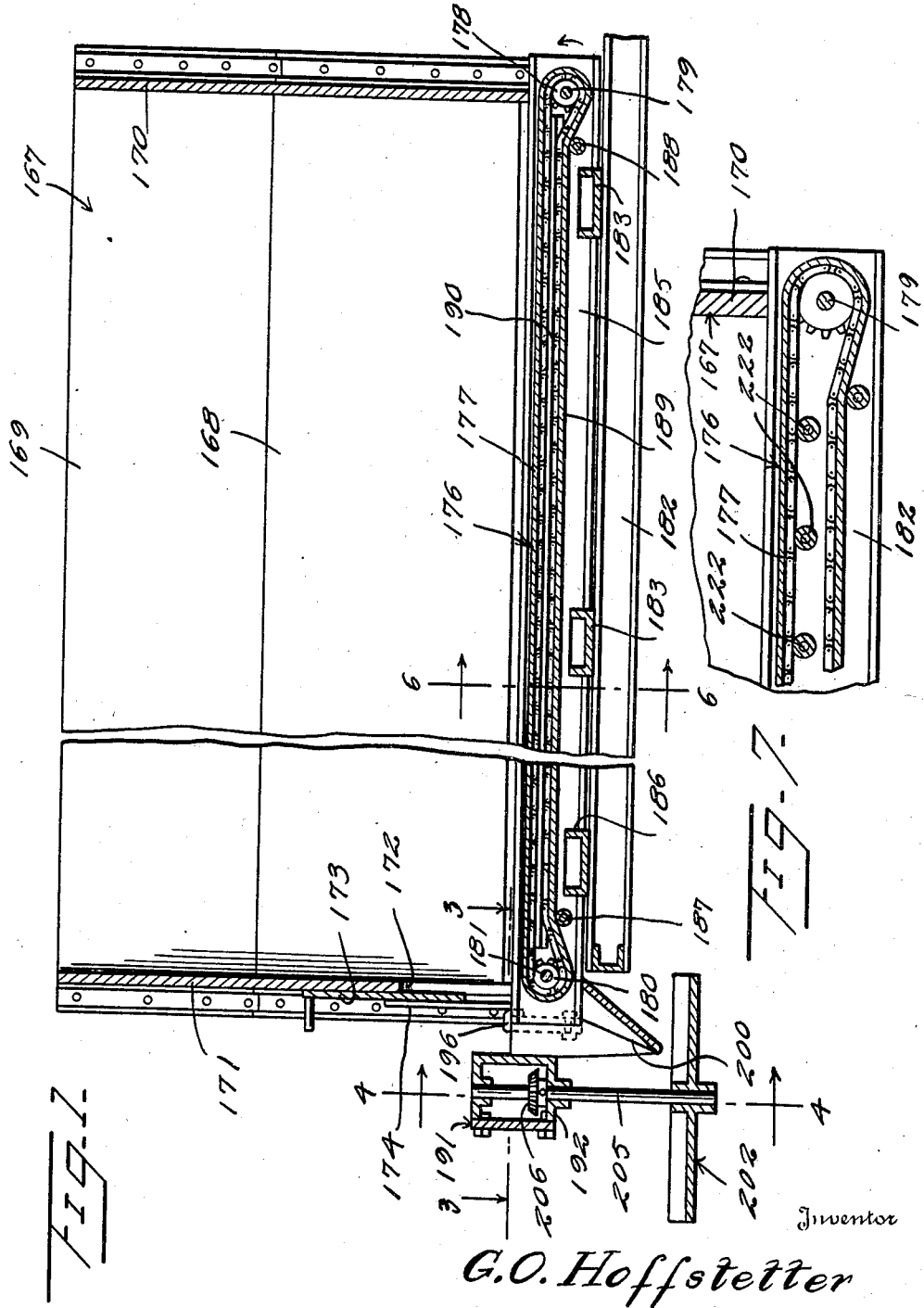

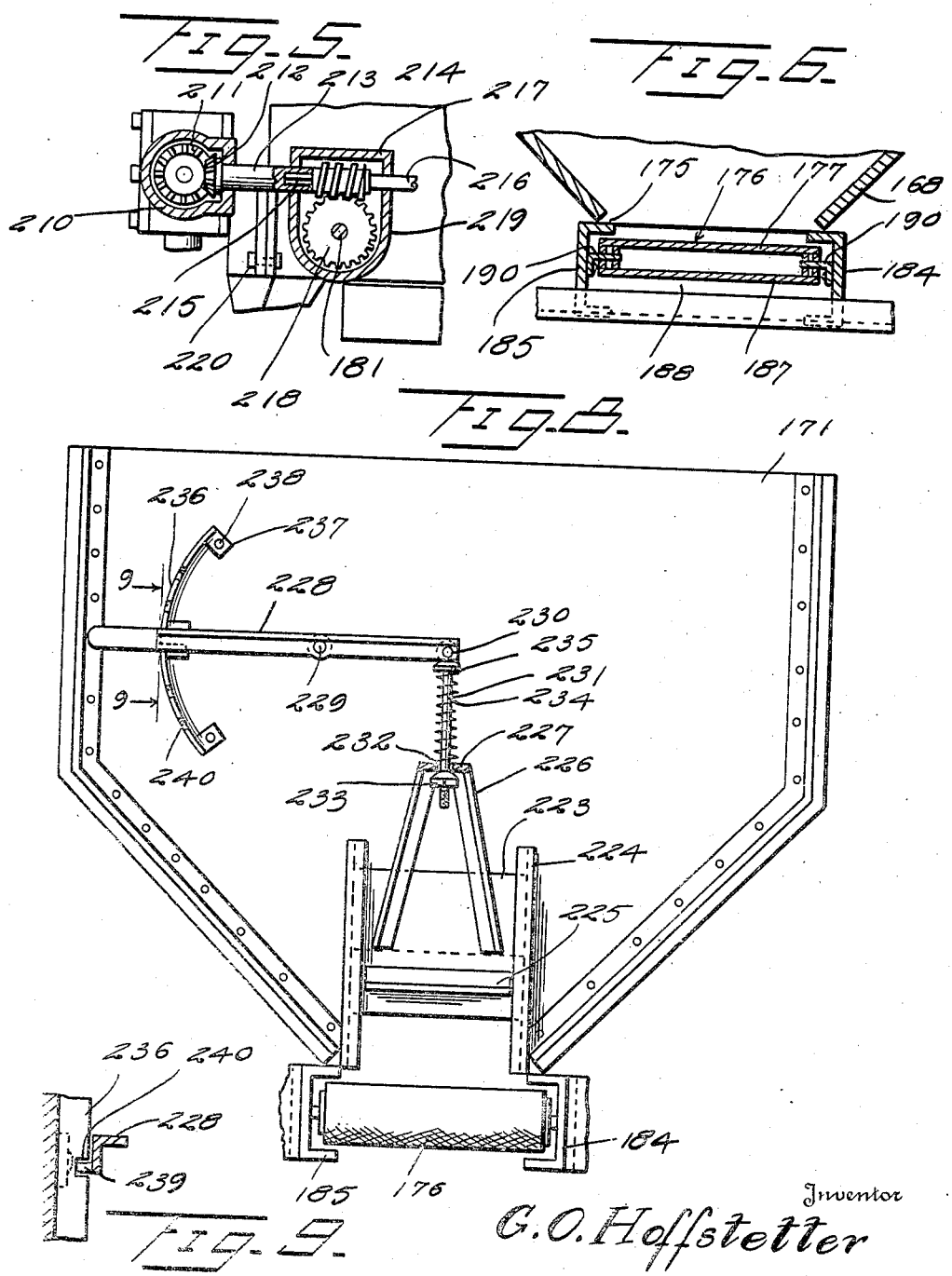

Patented Feb. 1, 1944

2,340,810

UNITED STATES PATENT OFFICE 2,340,810

MATERIAL SPREADER

George O. Hoffstetter, Jerseyville, Ill.

Application February 18, 1942, Serial No. 431,420

4 Claims. (Cl. 275—8)

This invention relates to material spreading or broadcasting devices.

This is a continuation in part of my Patent Number 2,293,977 issued August 25, 1942, for Material spreading devices.

An object of this invention is to provide a mobile spreading apparatus for spreading or broadcasting a fertilizer, such as lime, or other granular, comminuted, or crushed material, the spreading structure being connected with the power take-off of a truck or other power device.

Another object of this invention is to provide a device of this kind which is in the form of a two-purpose device, one purpose being for discharging the material in a relatively narrow ribbon on the ground, and the second purpose being for spreading the material in a wide path.

A further object of this invention is to provide a device of this kind which is capable of spreading either dry or moist material.

A further object of this invention is to provide an improved hopper for holding the material and an improved means for agitating the material in the lower portion of the hopper, so that the material will be in a condition for easy shifting toward the rear of the hopper.

A further object of this invention is to provide an improved spreader unit which is so constructed that the unit may be bodily removed from the hopper structure for repair or replacement of the parts thereof.

A further object of this invention is to provide a spreader unit which may be detachably coupled with the hopper structure and with a power source, so that the hopper structure which includes a conveying means may be used either by itself for discharging a narrow ribbon of the material on the ground, or may be combined with the spreader unit for spreading the material in a wide path.

A further object of this invention is to provide as a new article of manufacture, a spreader unit for detachable mounting on the end gate of a truck body, the unit being operatively coupled with the power take-off of the truck.

A further object of this invention is to provide in a detachable spreader unit for a truck body, an improved means for mounting the unit on the end gate of the truck, so that the unit may be quickly and easily mounted on or removed from the truck without the use of tools.

A further object of this invention is to provide a spreader unit which includes a hopper or chute for receiving the material from the conveyor and discharging the material at a selected point on the rotating spreader.

To the foregoing objects and others which may hereinafter appear, the invention consists of the novel construction, combination, and arrangement of parts as will be more specifically referred to and illustrated in the accompanying drawings, wherein are shown embodiments of the invention, but it is to be understood that changes, variations and modifications may be resorted to which fall within the scope of the invention as claimed.

In the drawings:

Figure 1 is a vertically sectional view taken longitudinally through a material spreading device constructed according to an embodiment of this invention, Figure 2 is a fragmentary side elevation of the rear portion of the device, Figure 3 is a sectional view taken on the line 3—3 of Figure 1, Figure 4 is a sectional view taken on the line 4—4 of Figure 1, Figure 5 is a sectional view taken on the line 5—5 of Figure 3, Figure 6 is a sectional view taken on the line 6—6 of Figure 1, Figure 7 is a fragmentary vertical section of a modified form of conveyor structure, Figure 8 is a detail rear elevation partly broken away of an improved automatically releasable gate, and Figure 9 is a sectional view taken on the line 9—9 of Figure 8.

Referring now to the drawings the numeral 167 designates generally a hopper structure which includes downwardly convergent bottom walls 168, vertical side walls 169 and front and rear end walls 170 and 171 respectively. The hopper 167 is formed in the rear wall 171 thereof with a discharge opening 172, and a vertically shiftable gate or valve 173 which is slidable in guide members 174 is adapted to regulate the amount of material which may be discharged through the opening 172.

The hopper 167 is formed in the lower portion thereof with a discharge opening 175 and an endless conveyor member 176 engages below the opening 175 and has the upper run 177 thereof disposed closely adjacent the lower edges of the bottom walls 168. The conveyor 176 may be constructed in the form of a chain conveyor which is mounted on a front sprocket or drum member 178 carried by a shaft 179 and a rear sprocket or drum member 180 fixedly mounted on a shaft 181. The upper run 177 of the conveyor 176 is substantially horizontal and in order to provide a means whereby the position of the hopper 167 with respect to the vehicle chassis 182 may be lowered, I have provided a plurality of transversely disposed supporting members 183 of channel form which are secured at the opposite ends thereof to the longitudinal beams forming the chassis 182. The conveyor 176 movably engages between a pair of opposed channel members 184 and 185 and preferably the channel members 184 and 185 are cut out as at 186 in order to permit the insertion of the transverse channel members 183 within the lower portions of the longitudinal channel members 184 and 185. The channel members 184 and 185 are disposed along the opposite longitudinal edges of the discharge opening 175, and preferably, the conveyor 176 engages adjacent the opposite edges thereof within the channels of the members 184 and 185 as shown in Figure 4.

A pair of idler rollers 187 and 188 are rotatably mounted between the channel members 184, 185, beneath the lower run 189 of the conveyor 176 and hold the lower run 189 in upraised position, so that the lower run 189 may readily pass over the upper edges of the transverse channel members 183.

As shown in Figure 1 the upper run 177 of the conveyor 176 may slidably engage at the opposite longitudinal edges thereof a pair of inwardly extending angle bars 190 which are fixedly secured to the vertical webs of the channel members 184 and 185.

A material distributor or spreader generally designated as 191 is mounted at the rear of the hopper 167 and includes a gear housing 192 which has formed integral therewith or fixed thereto a front plate 193 having a pair of forwardly extending flanges 194 formed at their forward terminal edges with outwardly extending flanges 195. The outturned flanges 195 at their upper ends are each formed with a supporting hook 196 which is adapted to engage over the upper edge of an angle bar 197 secured by fastening devices 198 to the outer sides of the channel members 184 and 185. A lower fastening member 199 may engage through a flange 195 adjacent the lower end portion thereof and also through the angle member 197, so that the distributor or spreader member 191 may be firmly mounted on the rear portion of the hopper 167. A downwardly reducing material guiding spout 200 is formed integral with the supporting structure including the plate 193 and the flanges 194 and 195 and extends downwardly therefrom. The forward or upper portion 201 of the spout 200 is adapted to project beneath the rear end portions of the channel members 184 and 185, as shown in Figure 2.

The material which is discharged from the spout 200 is adapted to drop onto the upper surface of a material spreader or broadcasting member 202 which includes a plate 203 and arcuate blades 204. The spreader member 202 is fixedly secured to a vertically disposed rotatable shaft 205 which is journalled in the housing 192 and extends downwardly therefrom. A bevelled gear 206 is fixedly mounted on the shaft 205 in the housing 192 and meshes with a second bevelled gear 207 carried by a stub shaft 208. The shaft 208 is journalled in a laterally projecting bearing 209 carried by the gear housing 192 and which bearing terminates in a laterally disposed gear housing 210. A bevelled gear 211 is secured to the outer end portion of the shaft 208 and meshes with a bevelled gear 212 carried by a stub shaft 213. The stub shaft 213 has a coupling socket 214 in its forward end in which is received a splined rear end 215 of a drive shaft 216.

The drive shaft 216 has fixedly mounted thereon a worm 217 which meshes with a worm gear 218 mounted in a worm gear housing 219. The worm gear 218 is fixedly secured to the roller or sprocket shaft 181 for rotating the drum or sprocket member 180.

The housing 219 is formed on its inner side with a bearing bushing 221 within which the shaft 181 rotatably engages. In Figure 7 there is shown a slightly modified form of this invention wherein the combined chain and belt conveyor 176 is mounted in the lower portion of the hopper 167 and the upper run 177 of the conveyor 176 engages a plurality of longitudinally spaced apart parallel rollers 222 which are mounted between the longitudinal channel members 184 and 185. In other respects the structure shown in Figure 7 will embody the same structure as shown in Figures 1 to 6 inclusive.

In Figures 8 and 9 there is disclosed a modified form of delivery gate wherein a gate 223 is slidably mounted in a pair of vertically disposed guide members 224 which are secured to the rear wall 171 of the hopper. The gate 223 has secured to the lower portion thereof and on the outer side an angle shaped horizontally disposed bracing member 225 which may be welded or otherwise fixedly secured to the gate 223. The gate 223 also has secured to the rear face thereof a pair of upwardly convergent angle bars 226 which are secured together at their upper ends and also secured to a horizontally disposed plate 227.

A rock lever or handle 228 is pivotally mounted on a pivot member 229 secured to the rear wall 171 and the inner end of the handle 228 has pivotally secured thereto as at 230 the upper end of a gate operating bar or rod 231. The rod 231 is slidable through an opening 232 which is formed in the plate 227 and the lower portion of the rod 231 has fixed thereto a collar 233. A spring 234 engages about the rod 230 and bears at its lower end against the upper side of the plate 227. The upper end of the spring 234 bears against a collar 235 mounted about the rod 231 and bearing against the adjacent end of the handle or lever 228. The handle or lever 228 is adjustably held in a selected position for adjustably disposing the gate 223 in the predetermined position with respect to the conveyor 176 by means of a longitudinally arcuate notched rack or quadrant 236.

The rack or quadrant 236 has fixed thereto a plurality of ears 237 which are secured by fastening devices 238 to the rear side of the rear wall 171. The handle or lever 228 is provided with a lug 239 which is engageable in a selected keeper or notch 240 formed in the adjacent edge of the quadrant 236. By providing the gate structure 223 with the spring presesd mounting or connection with the lever 228 in the event any large or hard object should be moved rearwardly by means of the conveyor 176, the hard object will not injure the conveyor 176 or break any portion of the device, as this hard object will push the gate 223 upwardly against the tension of the spring 234.

In the use and operation of this material spreader, the material such as lime, rock or the like is placed within the hopper structure 167. The conveyor 176 will be operated by means of the drive shaft 216, so as to move the material rearwardly for discharge through the delivery opening 172 in the rear wall 171. This material will be forced outwardly from the rear end of the hopper and will strike the rear wall 193 of the spreader unit delivery hopper formed by the hopper walls 193, 194, and 200.

The walls of the spreader unit, being downwardly inclined and downwardly convergent, will deliver the material in correlation with the rearwardly inclined wall 200 at a point closely adjacent the center of the spreader element 202.

In the event it is desired to remove the spreader unit, the bolts 199 may be removed and the spreader unit uncoupled from the drive shaft 216 through the medium of the splined coupling between the shaft 213 and the splined portion 214 of the shaft 216. The hooks 196 will permit the lifting vertically of the spreader unit, so as to thereby completely release the unit from the rear end of the main hopper structure. In the event the hopper is operated with the spreader unit removed therefrom, the material will be discharged from the conveyor 176 in a narrow ribbon on the surface of the ground.

The rear wall 193 of the spreader unit is disposed in horizontal alignment with the endless conveyor so that the material discharged from the conveyor will be forcibly discharged against the rear wall 193. This will result in a breaking up of the material and also a smoothing out of the flow of material through the spreader unit, with the result that an endless conveyor of the cleat or transverse link type may be used for certain types of material without producing an uneven spreading of the material. In other words, the vertical rear wall 193 constitutes a baffle or abutment against which the material impinges and the use of the regulator gate permits the operation of the conveyor at a fairly rapid rate so as to thereby discharge the desired quantity of material from the receiving hopper.

Where a chain conveyor is used without the baffle 193, there is a tendency for the material to be discharged in splurges, whereas the baffle 193 herein disclosed provides a means whereby the delivery of the material to the spreader elements is evened out and the broadcast of the material by the spreader unit is thus uniform and equalized regardless of the type of the conveyor.

What I claim is:

1. A material spreading apparatus comprising in combination a hopper body for mounting on a truck chassis, said body having a discharge opening in the lower portion thereof, an endless conveyor having one run thereof disposed below said opening and movable toward the rear of the hopper, a vertically movable regulator carried by the rear of the hopper, a centrifugal spreader unit at the rear of the hopper, means removably mounting said unit on said hopper, said means comprising oppositely extending angle members fixed relative to said hopper body, hooks fixed to said unit and engaging over said angle members, bolts extending through said angle members and said unit below said hooks, means connecting said conveyor at the rear of said hopper with a power source, and detachable coupling means carried by said unit and said connecting means whereby said unit will be connected with said power source, said coupling means comprising axially aligned telescoping shaft members.

2. A material spreading apparatus comprising in combination a material receiving hopper having a discharge opening in the lower portion thereof and also a delivery opening in an end wall thereof, an endless conveyor below said discharge opening for conveying the material in the direction of said delivery opening, a spreader unit extending from said conveyor and said delivery opening, rotatable spreader means carried by said spreader unit, said spreader unit including means for delivering the material adjacent the center of said spreader means and also a vertical abutment wall against which the material discharged by said conveyor is adapted to strike, and means detachably supporting said spreader unit rearwardly of said receiving hopper, said latter means comprising oppositely extending angle members fixed relative to said hopper body, hooks fixed to said unit and engaging over said angle members, and bolts extending through said angle members and said unit below said hooks.

3. A material spreading apparatus comprising in combination a material receiving hopper having a discharge opening in the lower portion thereof and also a delivery opening in an end wall thereof, and endless conveyor below said discharge opening for conveying the material in the direction of said delivery opening, a spreader unit extending from said conveyor and said delivery opening, rotatable spreader means carried by said spreader unit, said spreader unit including a vertical rear wall disposed in a position to be contacted by the material discharges from said conveyor to thereby break up any compacted material and also including adjacent downwardly and inwardly inclined walls for guiding the material toward the center of said spreader means, and means detachably supporting said spreader unit rearwardly of said receiving hopper, said latter means comprising oppositely extending angle members fixed relative to said hopper body, hooks fixed to said unit and engaging over said angle members, and bolts extending through said angle members and said unit below said hooks.

4. A material spreading apparatus comprising in combination a material receiving hopper having a discharge opening in the lower portion thereof and also a delivery opening in an end wall thereof, an endless conveyor below said discharge opening for conveying the material in the direction of said delivery opening, a spreader unit extending from said conveyor and said delivery opening, rotatable spreader means carried by said spreader unit, said spreader unit including a pair of downwardly convergent side walls and a downwardly and rearwardly inclined forward wall for delivering the material adjacent the center of said spreader means, said spreader unit also including a vertical rear wall disposed in a position to be contacted by the material discharged from said conveyor to thereby break up any compacted material, means detachably supporting said spreader unit rearwardly of said receiving hopper, said latter means comprising oppositely extending angle members fixed relative to said hopper body, hooks fixed to said unit engaging over said angle members, bolts extending through said angle members and said unit below said hooks, a vertically shiftable gate carried by the rear wall of said receiving hopper, and axially aligned telescoping shaft members for detachably coupling said conveyor to said unit.

GEORGE O. HOFFSTETTER.